United States Patent [19]

Takawashi et al.

[11] Patent Number: 4,458,190

[45] Date of Patent: Jul. 3, 1984

[54] ELECTRIC DISCHARGE MACHINING CONTROL DEVICE

[75] Inventors: Tamio Takawashi; Toshimitsu Sakakibara; Shigeo Yamada; all of Aichi, Japan

[73] Assignee: Mitsubishi Denki Kabushiki Kaisha, Tokyo, Japan

[21] Appl. No.: 390,601

[22] Filed: Jun. 21, 1982

[30] Foreign Application Priority Data

Jun. 25, 1981 [JP] Japan .................................. 56-98745

[51] Int. Cl.³ .......................................... G05B 19/28
[52] U.S. Cl. .................................... 318/603; 318/607; 318/636; 219/124.03
[58] Field of Search ...................... 219/124.03, 124.02; 318/607, 603

[56] References Cited

U.S. PATENT DOCUMENTS

| | | | |
|---|---|---|---|
| 3,398,342 | 8/1968 | Redman | 219/124.02 |
| 3,646,309 | 2/1972 | Smith, Jr. | 219/124.02 |
| 3,970,911 | 7/1976 | Schmall | 219/124.02 |
| 4,170,727 | 10/1979 | Wilkins | 219/124.03 |
| 4,363,468 | 12/1982 | Noe | 219/124.02 |

Primary Examiner—Dobeck B.
Attorney, Agent, or Firm—Sughrue, Mion, Zinn, Macpeak & Seas

[57] ABSTRACT

In an electric discharge machine in which the machining gap between an electrode and a workpiece is maintained suitably by a control device having sampling, logic operation and holding functions, an up-down counter is provided for integration, over a predetermined period corresponding to the sampling period, servo signals from a discrimination circuit adapted to discriminate the conditions of the machining gap, so that sampling for all periods of time within the sampling period can be achieved.

8 Claims, 14 Drawing Figures

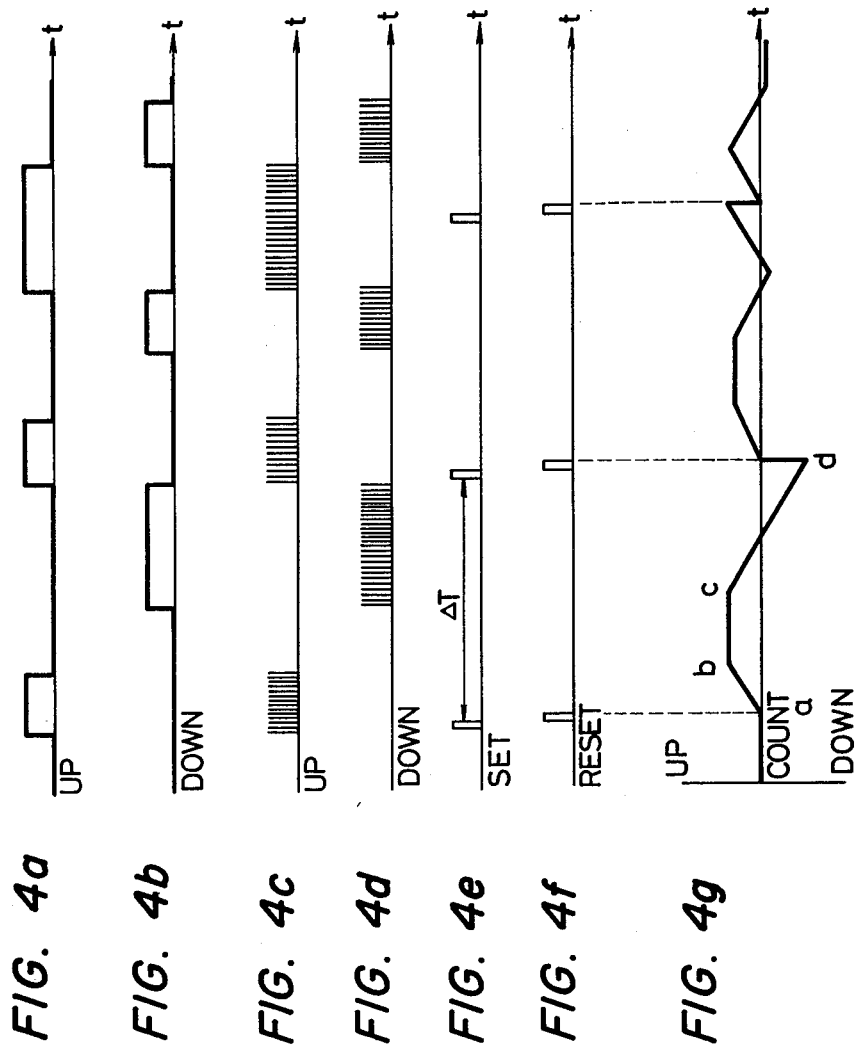

ELECTRIC DISCHARGE MACHINING CONTROL DEVICE

BACKGROUND OF THE INVENTION

This invention relates to control devices for electric discharge machines (hereinafter referred to as "electric discharge machining control devices"), and more particularly to an electric discharge machining control device in which the machining gap between an electrode and a workpiece is suitably controlled by a position control servo system having sampling, logic operation and holding functions.

In general, it is essential that the servo system of an electric discharge machine quickly control the machining gap in response to the electric discharge conditions. Accordingly, a servo actuator such as a hydraulic cylinder, a pulse motor or a DC servo motor has been employed to drive the machining electrode. Furthermore, a position control servo system having sampling, logic operation and holding functions has been used to control the machining gap. A general purpose processing unit such as a microprocessor or microcomputer has been employed for the position control servo system.

FIG. 1 shows one example of an electric discharge machining control device of this type. In this device, a DC servo motor is employed as the actuator. A current-controlled pulse voltage is applied across the discharging gap between an electrode 12 and workpiece 14 by an electric source 16. The pulse voltage, after being converted into a servo signal (down) for decreasing the machining gap and a servo signal (up) for increasing the machining gap according to the respective discharge periods by means of discrimination circuit 18, is applied to a sample value processing unit 20 which has sampling, logic-operation and holding functions.

In the processing device 20, an input latching circuit 22 is caused to sample the above-described servo signal every period of time $\Delta T$. The servo signal thus sampled is converted into a main shaft position instruction signal by a logic operation circuit 24. The instruction value is held by an output latch circuit 26 until the next instruction value is provided. The instruction value is a parallel digital output. The parallel digital output is converted into a series digital output by a binary rate multiplier (BRM) 28 and is then applied, as a count input, to an error counter 30 which forms a position control servo system. In the counter 30, the instruction value mentioned above is reduced by the amount of displacement of the main shaft which has been detected by a main shaft position detector 44. The result of this subtraction, namely, a position error value, is converted into an analog signal by a D/A converter 32. The analog signal is applied, as a speed instruction, to an electrode drive speed control servo system which comprises a speed amplifier 34, a DC servo motor 36 and a specified speed generator 38. That is, the DC servo motor 36 is driven by the analog signal, to turn a ball screw 40, to thereby displace the main shaft 42 to which the electrode 12 has been fixedly secured, until the displacement of the main shaft 42 coincides with the position instruction, thus controlling the machining gap.

The discrimination circuit 18 is substantially similar to that disclosed by U.S. Pat. No. 3,825,715, and operates as described below.

The waveforms of the voltage and current applied to the machining gap in FIG. 1 are as shown in FIGS. 2a and 2b, respectively. As is apparent from FIG. 2, in many cases, electric discharge is not caused immediately after the voltage pulse is applied across the machining gap; in other words, a no-load voltage 100 appears for a certain period of time, and thereafter electric discharge occurs, i.e., a discharge current 102 flows while a voltage 104 is developed across the machining gap. This electric discharge is suspended at the start of a pause time 106.

The provision of the non-load voltage 100 as described above means that the dielectric strength of the machining gap has been sufficiently recovered during the pause time. When electric discharge occurs within a period of time $\tau_2$, it is determined that the gap length is suitable, and a "stop signal" as shown in FIG. 2d is provided as the servo signal; and when electric discharge occurs within a period of time $\tau_3$, it is determined that the gap length is excessive, and an "electrode-down-signal" as shown in FIG. 2c is provided. On the other hand, when the no-load voltage is developed for a very short time or when it is not developed at all, the dielectric strength of the machining gap was not recovered during the pause time. Therefore, when electric discharge takes place within the period of time $\tau_1$ it is determined that the gap length is too short, and an "electrode-up-signal" as shown in FIG. 2e is provided. As is apparent from the above description, the discrimination circuit 18 outputs the servo signal for every pulse voltage.

The conventional discrimination circuit 18 provides a servo signal for each discharge pulse as described above. Therefore, the circuit samples an instantaneous value at the time of sampling as an input means for a sample value control system performing a sampling operation at predetermined intervals, thus disregarding the servo signal between sampling time instants. Therefore, as is known from sampling theory, the discrimination circuit forms a filter whose frequency is about half of the sampling frequency. Accordingly, it is difficult for the conventional discharge machining control device to perform servo control with a good follow-up characteristic.

SUMMARY OF THE INVENTION

In view of the foregoing, an object of this invention is to provide an electric discharge machining control device which can perform servo control with an excellent follow-up characteristic.

The invention is characterized in that a sampling value control system is combined with a digital integration circuit which includes an up-down counter for integrating, with a period corresponding to the sampling period, servo signals from a discrimination circuit adapted to discriminate the conditions of the machining gap, and a register for holding the count value of the up-down counter provided every predetermined period, whereby sampling for all the periods of time in the sampling period can be achieved. Accordingly, the condition of the machining gap in the electric discharge machine can be detected correctly, as a result of which servo control of excellent follow-up characteristics can be performed according to the conditions of the machining gap, i.e., the machining characteristic may be greatly improved.

The nature, principle and utility of the invention will become more apparent from the following detailed description when read in conjunction with the accompanying drawings, in which like parts are designated by like reference numerals or characters.

BRIEF DESCRIPTION OF THE DRAWINGS

In the accompanying drawings:

FIGS. 4a-4g are time chart diagrams for describing the operation of the control device according to the invention.

DETAILED DESCRIPTION OF THE PREFERRED EMBODIMENTS

Figure 1:
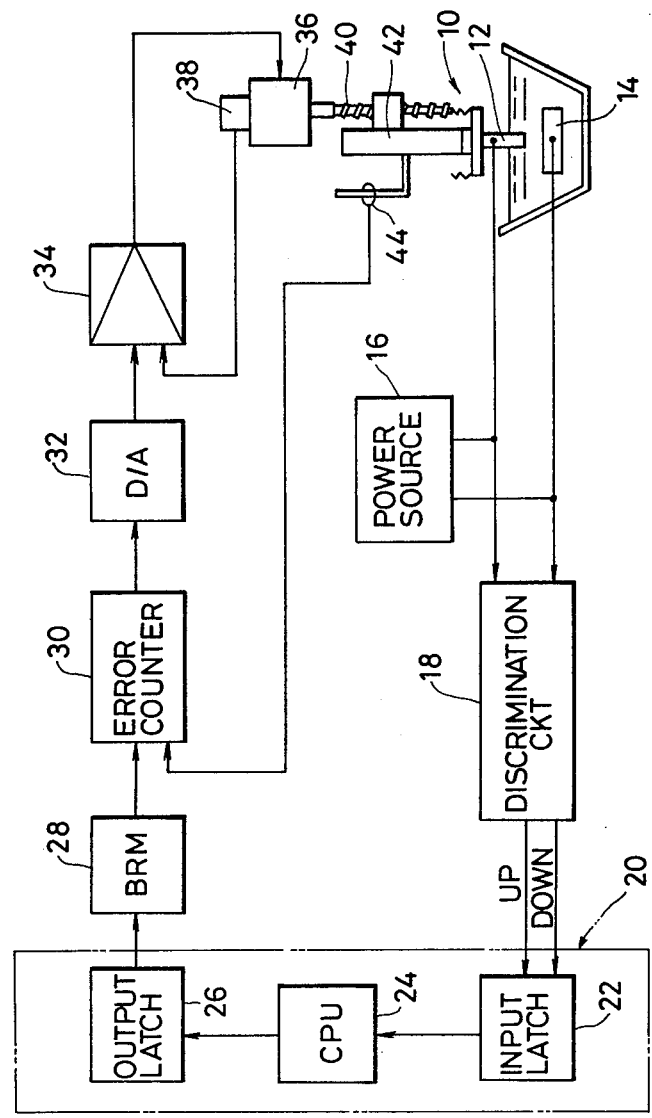
FIG. 1 is a block diagram showing a conventional electric discharge machining control device.
Figure 2A:
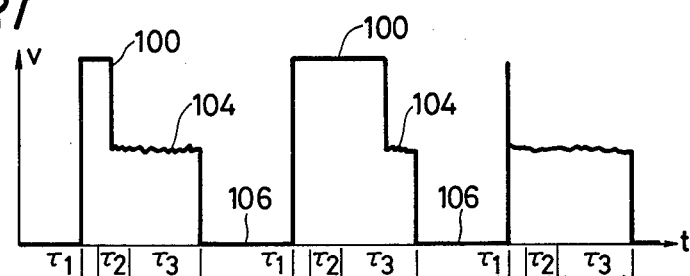
FIGS. 2a-2e are time chart diagrams for describing the operation of the control device of FIG. 1.
Figure 2B:
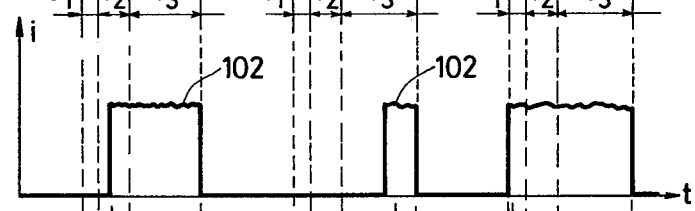
Figure 2C:
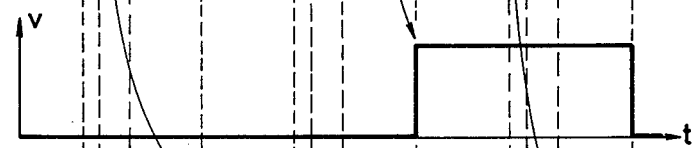
Figure 2D:
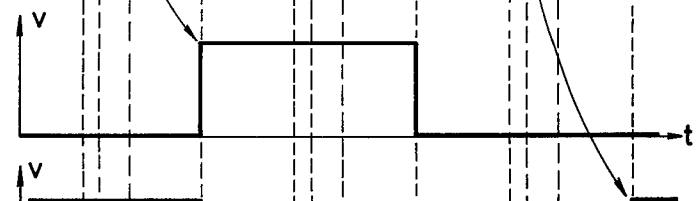
Figure 2E:
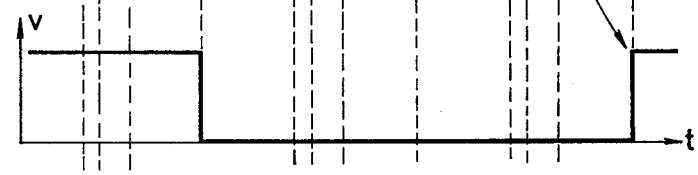
Figure 3:
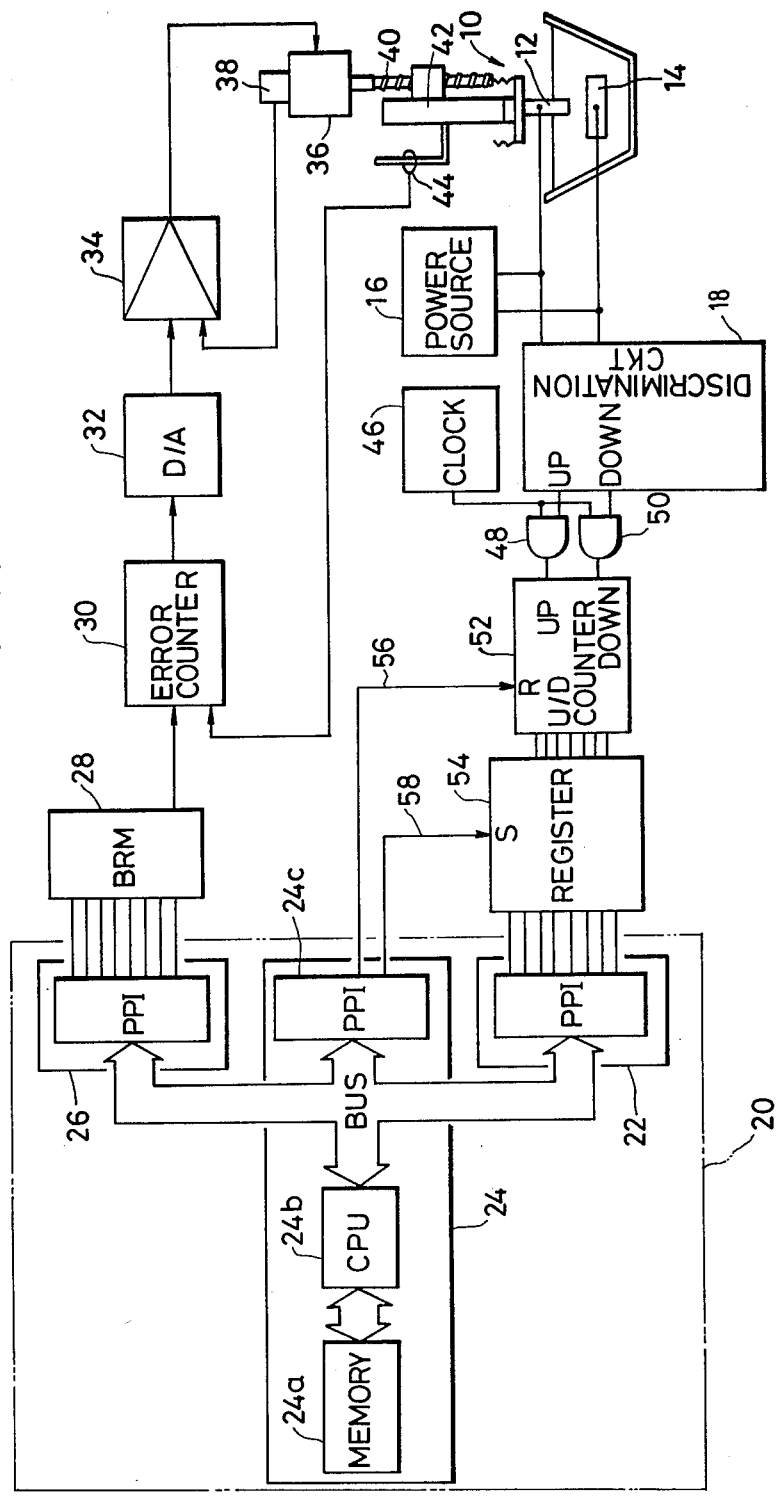
FIG. 3 is a block diagram showing one example of an electric discharge machining control device according to this invention.

One example of an electric discharge machining control device according to this invention is as shown in FIG. 3, in which those components which have been previously described with reference to FIG. 1 are designated by the same reference numerals or characters.

The output terminal of a reference clock circuit 46 is connected to AND circuits 48 and 50 to which the "up" servo signal and the "down" servo signal are supplied from the discrimination circuit 18, respectively. The output terminals of the AND circuits 48 and 50 are connected to the "up" input terminal and the "down" input terminal of an up-down counter 52 which functions as an integrator. Connected to the output side of the up-down counter 52 is a register 54 for holding the count value of the up-down counter 52. The logic circuit 24 is made up of a CPU (central processing unit) 24b, a memory 24a, and a control interface (or a programmable peripheral interface) 24c. The control signal 56 of the logic operation circuit 24 is applied to the reset terminal R of the up-down counter 52, so that the count content of the latter is reset at predetermined intervals. Similarly, a control signal 58 of the logic operation circuit 24 is applied to the set terminal S of the register 54, so that the output of the up-down counter 52 is set. The output of the register 54 is supplied to the input latch circuit 22 in the sampling value processing circuit 20, and the signal is delivered to the CPU 24b through the bus.

The system made up of the sampling value processing unit 20, the BRM 28, the error counter 30, the D/A converter 32, the speed amplifier 34, the DC servo motor 36, the specified speed generator 38 and the main shaft position detector 44 will be referred to as "the electrode position control servo system" hereinafter.

The operation of the electric discharge machining control device thus arranged will be described with reference to FIG. 4. FIGS. 4a and 4b show the "up" and "down" servo signals outputted by the discrimination circuit 18, respectively, and FIGS. 4c and 4d illustrate input signals which are supplied to the "up" and "down" input terminals of the up-down counter 52. FIG. 4e shows the set signal supplied to the set terminal S of the register 54, FIG. 4f illustrates the reset signal applied to the reset terminal R of the up-down counter 52, and FIG. 4g shows the count status of the up-down counter 52.

First, the "up" servo signal and the "down" servo signal are obtained from the discrimination circuit 18 in response to the voltage pulses, as shown in FIGS. 4a and 4b. In order to obtain the rate of the "up" and "down" servo signals in a predetermined period of time irrespective of the magnitude of the voltage pulse width, the "up" and "down" servo signals and the high frequency output of a reference clock circuit 46, whose pulse width is much smaller than the voltage pulse width, are supplied to the AND circuits 48 and 50 as shown in FIG. 3, and the (AND) outputs of the AND circuits 48 and 50, as shown in FIGS. 4c and 4d are supplied to the up-down counter 52, where they are subjected to integration for a predetermined period of time.

On the other hand, the set signal 58 and the reset signal 56 are output by the logic operation circuit 24 every interval of time $\Delta T$ corresponding to the sampling period, as shown in FIGS. 4e and 4f. Due to the set signal, the count value of the up-down counter 42 is set in the register 54. Then, after being reset by the above-described reset signal, the up-down counter 52 starts counting the "up" pulse at the time instant a in FIG. 4g, and holds the count value at the time instant b corresponding to the end of the up pulse. The counter 52 carries out subtraction by counting the "down" pulse from the time instant c, and sets the resulting count value at the time instant d with the aid of the set signal provided by the logic operation circuit 24 at the end of the period of time $\Delta T$. Thereafter, the counter is reset and the operation is continued similarly, so that, with the servo signals between successive sampling time instants being integrated, the servo signals are supplied through the register to the sampling value control system including the input latch circuit 22, the logic operation circuit 24 and the output latch circuit 26. That is, the register 54 supplies a signal corresponding to the count value set therein, as the sampling signal, to the input latch circuit 22. This sampling signal is then converted into a main shaft position instruction value by the logic operation circuit 24. The instruction value is held by the output latch circuit 26 for the period of time $\Delta T$, and is then supplied to the position control servo system comprising the error counter 30, the D/A converter 32, the speed amplifier 34, the DC servo motor 36, the specified speed generator 38 and the main shaft position detector 44. As a result, the same operation as that described with reference to FIG. 1 is carried out to move the main shaft 42 to thereby control the gap between the electrode 12 and the workpiece 14.

What is claimed is:

1. In a control device for an electric discharge machine in which a machining electrode confronts a workpiece to be machined, and wherein a number of pulse voltages are applied across a gap therebetween so that electric discharge takes place between said electrode and workpiece, to thereby machine said workpiece, the improvement comprising;

a discrimination circuit connected between said electrode and workpiece, for detecting electric discharge conditions in said gap between said electrode and workpiece for every said pulse voltage, to output a servo signal for increasing or decreasing said gap;

an up-down counter for integrating said servo signal from said discrimination circuit for a predetermined period of time; and a position control servo device for controlling said gap to a suitable value according to an output of said up-down counter.

2. A control device as claimed in claim 1, further including a register for holding a count value of said up-down counter, said count value being provided at the end of each said predetermined period of time, said register being connected to the output side of said up-down counter, and said position control servo device being operated according to an output signal from said register.

3. A control device as claimed in claim 2, wherein said position control servo device includes a sampling value processing device for receiving and processing said output signal of said register to produce a control signal for controlling said gap according to said output signal of said register.

4. A control device as claimed in claim 3, wherein said sampling value processing device is connected to the output side of said register, said sampling value processing device including an input latch circuit for latching an output of said register; a logic operation circuit connected to said input latch circuit, for generating an electrode position instruction value according to an output signal of said register; and an output latch circuit for latching said electrode position instruction value, and said logic operation circuit being connected to said up-down counter and said register, for applying a reset signal and a set signal thereto, respectively, after every said predetermined period.

5. A control device as claimed in claim 1, wherein a signal output by said discrimination circuit operates to cause said up-down counter to increase or decrease a count value thereof as a servo signal for decreasing or increasing said gap.

6. A control device as claimed in claim 1, further comprising a pair of AND circuit means having first input terminals connected to the output side of said discrimination circuit, output terminals connected to said up-down counter, and second input terminals connected to reference clock means for generating a high frequency clock pulse.

7. A control device as claimed in claim 6, said reference clock means generating a high frequency clock pulse whose pulse width is substantially less than that of said pulse voltage.

8. A control device as claimed in claim 7, said up-down counter varying the count value thereof with a frequency equal to that of said clock pulse.

* * * * *